(12) United States Patent
Breure

(10) Patent No.: US 12,517,517 B2
(45) Date of Patent: Jan. 6, 2026

(54) METHOD FOR PERFORMING AN AGRICULTURAL OPERATION ON A PREDEFINED WORKING AREA WHICH IS PROCESSED BY MEANS OF AN AGRICULTURE MACHINE

(71) Applicant: PLOEGER OXBO EUROPE B.V., Roosendaal (NL)

(72) Inventor: Hendrik Willem Breure, Roosendaal (NL)

(73) Assignee: PLOEGER OXBO EUROPE B.V., Roosendaal (NL)

( * ) Notice: Subject to any disclaimer, the term of this patent is extended or adjusted under 35 U.S.C. 154(b) by 488 days.

(21) Appl. No.: 18/014,988

(22) PCT Filed: Jul. 7, 2021

(86) PCT No.: PCT/NL2021/050432
§ 371 (c)(1),
(2) Date: Jan. 6, 2023

(87) PCT Pub. No.: WO2022/010351
PCT Pub. Date: Jan. 13, 2022

(65) Prior Publication Data
US 2023/0259135 A1    Aug. 17, 2023

(30) Foreign Application Priority Data
Jul. 10, 2020   (NL) .................................... 2026042

(51) Int. Cl.
G05D 1/00    (2024.01)
A01B 69/04   (2006.01)
A01D 80/00   (2006.01)

(52) U.S. Cl.
CPC ........... *G05D 1/0219* (2013.01); *A01D 80/00* (2013.01); *G05D 1/0291* (2013.01)

(58) Field of Classification Search
CPC .... G05D 1/0219; G05D 1/0291; A01D 80/00; A01D 57/20; A01D 84/00; A01B 69/008
(Continued)

(56) References Cited

U.S. PATENT DOCUMENTS 6,205,757 B1    3/2001  Dow et al.
6,591,145 B1*   7/2003  Hoskinson ............. G05D 27/02
                                                    700/47
(Continued)

FOREIGN PATENT DOCUMENTS

EP    2789223 A1     10/2014
WO    2020/046114 A1  3/2020

OTHER PUBLICATIONS

International Search Report (ISR) for PCT/NL2021/050432 mailed Sep. 16, 2021 (4 pages).
(Continued)

*Primary Examiner* — Jaime Figueroa
(74) *Attorney, Agent, or Firm* — Jason A. Smith; Shumaker, Loop & Kendrick, LLP (57) ABSTRACT

A method for performing an agricultural operation on a predefined working area which is processed by means of an agriculture machine comprising at least one elongate unit, wherein by means of the at least one elongate unit plant material is displaced substantially in a displacement direction and laid down in rows of plant material on the predefined working area, and an agriculture machine.

16 Claims, 8 Drawing Sheets

(58) Field of Classification Search
USPC ...................................................... 701/1, 50
See application file for complete search history.

(56) References Cited

U.S. PATENT DOCUMENTS

| | | | | |
|---|---|---|---|---|
| 6,971,225 | B1* | 12/2005 | Kempf | A01D 57/20 |
| | | | | 56/398 |
| 7,028,459 | B2* | 4/2006 | Lohrentz | A01D 57/20 |
| | | | | 56/192 |
| 7,310,929 | B2* | 12/2007 | Dow | A01B 73/02 |
| | | | | 56/192 |
| 10,670,708 | B2* | 6/2020 | Kemmer | G01S 13/865 |
| 11,234,366 | B2* | 2/2022 | Darr | A01D 41/1278 |
| 11,533,846 | B2* | 12/2022 | Miller | A01D 41/127 |
| 11,665,998 | B2* | 6/2023 | Fasick | A01D 41/1274 |
| | | | | 701/50 |
| 11,758,844 | B2* | 9/2023 | White | A01D 41/127 |
| | | | | 701/50 |
| 11,778,938 | B2* | 10/2023 | Liu | A01C 7/088 |
| | | | | 701/50 |
| 12,310,290 | B2* | 5/2025 | Breure | A01D 89/008 |
| 2004/0060271 | A1* | 4/2004 | Ameye | A01F 29/14 |
| | | | | 56/10.8 |
| 2004/0200203 | A1 | 10/2004 | Dow et al. | |
| 2005/0120696 | A1* | 6/2005 | Lohrentz | A01D 57/20 |
| | | | | 56/192 |
| 2005/0273253 | A1* | 12/2005 | Diekhans | G01C 21/20 |
| | | | | 701/50 |
| 2008/0209878 | A1* | 9/2008 | Farley | A01D 41/127 |
| | | | | 701/50 |
| 2010/0037584 | A1* | 2/2010 | Dow | A01D 80/005 |
| | | | | 56/376 |
| 2010/0262342 | A1 | 10/2010 | Dix et al. | |
| 2015/0253427 | A1* | 9/2015 | Slichter | G01S 17/42 |
| | | | | 356/5.01 |
| 2017/0112045 | A1 | 4/2017 | Dix et al. | |
| 2017/0280627 | A1* | 10/2017 | Treffer | A01D 43/086 |
| 2018/0120133 | A1* | 5/2018 | Blank | G01D 18/002 |
| 2018/0188366 | A1* | 7/2018 | Kemmer | A01F 15/0825 |
| 2018/0317388 | A1* | 11/2018 | Gresch | A01D 41/1274 |
| 2018/0325032 | A1* | 11/2018 | Rotole | G05D 1/0278 |
| 2018/0332771 | A1 | 11/2018 | Digman | |
| 2020/0077584 | A1* | 3/2020 | Miller | A01D 41/145 |
| 2020/0260646 | A1* | 8/2020 | Fasick | A01D 41/1274 |
| 2020/0323134 | A1* | 10/2020 | Darr | A01D 41/1278 |
| 2021/0048290 | A1* | 2/2021 | Henry | G06T 7/0002 |
| 2021/0321554 | A1* | 10/2021 | Liu | G05D 1/0219 |

OTHER PUBLICATIONS

Written Opinion (WO) for PCT/NL2021/050432 mailed Sep. 16, 2021 (7 pages).

* cited by examiner

METHOD FOR PERFORMING AN AGRICULTURAL OPERATION ON A PREDEFINED WORKING AREA WHICH IS PROCESSED BY MEANS OF AN AGRICULTURE MACHINE

TECHNICAL FIELD AND BACKGROUND

The invention relates to a method for performing an agricultural operation on a predefined working area which is processed by means of an agriculture machine comprising at least one elongate unit, wherein by means of the at least one elongate unit plant material is displaced substantially in a displacement direction and laid down in rows of plant material on the predefined working area.

The invention also relates to an agriculture machine for performing an agricultural operation on a predefined working area, the agriculture machine comprises at least one elongate unit, wherein the at least one elongate unit is configured to displace the plant material substantially in a displacement direction and lay down the plant material for forming rows of plant material on the predefined working area.

Figure 1:
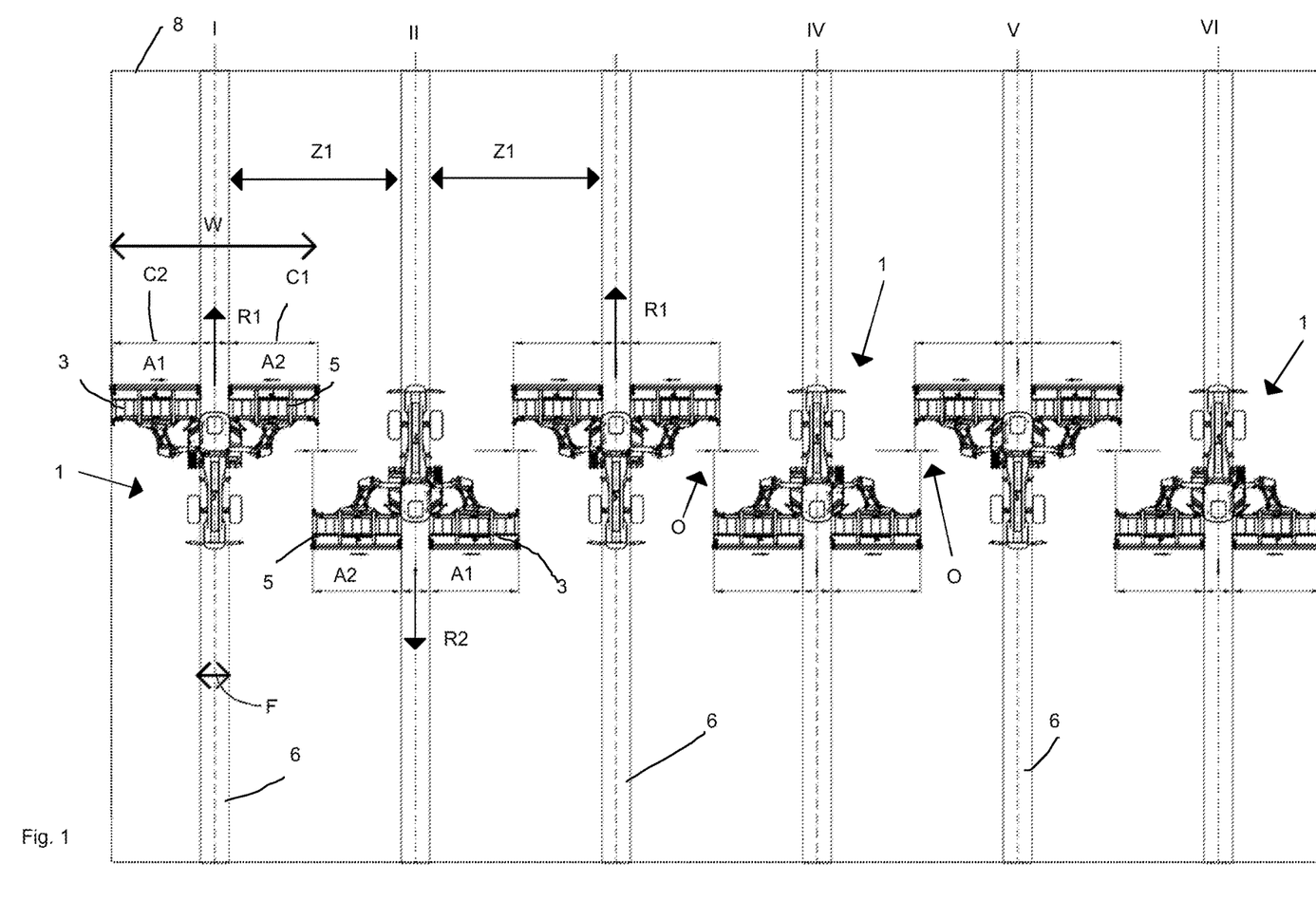
FIG. 1 shows a top view of a predefined working area showing the travel paths of a self-propelled agricultural machine in the operating mode for forming equidistant rows of plant material on the land.

WO 2020/046114 discloses such an agriculture machine which is also able to perform the above described method. It is known to use such an agriculture machine to provide substantially equidistant rows of plant material on the land, if there are no obstacles on the land, as shown in FIG. 1 of the enclosed drawings. Although the known method for performing an agricultural operation on the land works well, it is on object of the present disclosure to provide a method enabling to use novel patterns of rows of plant material in a predefined working area to process the plant material in the predefined working area in an operator friendly manner.

SUMMARY

This objective is achieved by a method for performing an agricultural operation on a predefined working area as disclosed herein.

The method for performing an agricultural operation on a predefined working area uses an agriculture machine to process the predefined working area. The agriculture machine comprises at least one elongate unit, wherein by means of the at least one elongate unit plant material is displaced substantially in a displacement direction and laid down in rows of plant material on the predefined working area. The rows being formed by the agriculture machine extend substantially parallel to the direction of travel of the agriculture machine. The at least one elongate unit may extend substantially traverse to the direction of travel of the agriculture machine such that the displacement direction of the at least one elongate unit is substantially to the right or to the left with respect to the direction of travel. Alternatively, the elongate unit may also during processing the plant material form an obtuse or acute angle with respect to the direction of travel. In addition, the at least one elongate unit may be configured to pick up the plant material from the land before displacing the plant material substantially in the displacement direction. Alternatively, a separate first elongate unit may be provided for picking up the plant material and a second elongate unit following the first unit may be provided to displace the plant material substantially in a displacement direction for forming rows of plant material on the predefined working area. The method further uses at least one tracking device configured for determining the position of the agriculture machine on the predefined working area and a control device configured for determining the displacement direction of the at least one elongate unit for forming each row of laid down plant material on the predefined working area and/or for determining a travel path sequence of the agriculture machine for the formation of rows of laid down plant material on the predefined working area. The control device is configured to use a predetermined irregular pattern of rows of plant material in the predefined working area to process the plant material in the predefined working area by performing at least one of the following steps based on input of the at least one tracking device:

- change or indicate to change the displacement direction of the at least one elongate unit between a formed row and a row to be formed in the predefined working area;
- change or indicate to change a travel path between a formed row and a row to be formed in the predefined working area, wherein between the row to be formed and the formed row there is at least one further travel path which has been processed or is to be processed by the agriculture machine.

By using such a predetermined irregular pattern of rows of plant material in the predefined working area, i.e. such that the plant material is laid down in rows on the predefined work area wherein during the lay down process the distance between adjacent rows is not equidistant, it is possible to cover more working area's by the agriculture machine in a manner less independent of the dimensions of the working area than when using the known method as shown in FIG. 1. Changing the displacement direction of the at least one elongate unit during a transition between a formed row and a row to be formed in the predefined working area can be an efficient manner to provide an irregular pattern of rows during processing the predefined working area, as the displacement direction can be changed automatically or manually during steering between travel paths of the agriculture machine with no impact on the total driving distance of the agriculture machine. Alternatively, it is also possible to adapt the travel path sequence to process the plant material in the predefined working area by using the predetermined irregular pattern of rows of plant material in the predefined working area. In an aspect of the method it is also possible to use both steps, i.e. to change displacement direction at least once and to use non-adjacent travel paths in the travel path sequence at least once to process the complete surface of a predefined working area, i.e. by using the two steps maximum flexibility for processing predefined working areas may be obtained.

An additional advantage of the method is that in the predefined working area less rows of plant material can be produced after processing the complete predefined area compared to the method shown in FIG. 1 for the processed working area having the same dimensions. A row of plant material is also called a windrow. Windrows (rows of plant material) may be deposited on the land for a subsequent operation to be performed. The subsequent operation may be, for example, chopping, pressing or picking up with a loader wagon. After using the method disclosed in this disclosure a lower number of windrows may need to be processed in the subsequent operation for a processed area of the same dimensions, such that the subsequent operation can be performed in a more efficient manner.

By using the irregular pattern of rows of plant material flexibility is increased while the method steps to be performed require no or minimal operator intervention or are presented in such a manner that the operations to be performed can be easily executed by the operator without special skills and/or without or minimal training.

The predefined working area may be free of any obstacles, for example by adapting the dimensions of the predefined working area or by using more than one predefined working area. It is also possible that the control device takes into account any obstacles in the predefined working area, such that in a sub-area of the predefined working area a modified pattern will be formed taken into account the obstacle(s). In the predetermined irregular pattern of rows of plant material the distance between two adjacent rows to be formed, wherein the rows may extend substantially parallel or with the same radius of curvature with respect to each other, and two other adjacent rows to be formed in the predefined working area varies during processing the plant material in the predefined working area.

In one aspect of the method the agriculture machine or a vehicle pulling the agriculture machine is automatically driven to process the plant material in the predefined working area. In this manner it is possible to process the predefined working area in a relatively operator-friendly way in a semi-automated agriculture machine/vehicle or even without an operator on an autonomous agriculture machine/vehicle. In the latter, an operator may monitor from a central station a number of autonomous agriculture machines/vehicles, such that the land to be processed is being processed in a highly efficient manner.

In the agriculture machine it is further possible that based on instructions received from the control device the displacement direction of the at least one elongate unit between a formed row and a row to be formed in the predefined working area is automatically changed. This agriculture machine is not only operator-friendly, but may also be more efficient as the risk of incorrect actions of the operator can be reduced or excluded.

Alternatively or complementary to the above described automatically performed steps, the step or steps to be performed for processing the plant material in the predefined working area using the predetermined irregular pattern of rows of plant material in the predefined working area may be provided to an operator by at least one indicator, for example by the at least one indicator in a cabin of the agriculture machine or in a cabin of a vehicle pulling the agriculture machine. By using an indicator, for example an audible, visual and/or tactile indicator, in a cabin of the agriculture machine or in a cabin of a machine pulling the agriculture machine, the operator can be instructed or warned in a user-friendly manner to change the displacement direction and/or to change the travel path sequence. The indicator can also be used as a verification means for the operator that at least one of the automatically performed steps mentioned above will be executed and/or is executed.

In a further aspect, the control device is configured to receive information about the predefined working area to be processed by the agriculture machine and/or to receive parameters for providing a predetermined irregular pattern of rows of plant material. For example, the control device may comprise an operator input device which may include a keyboard, touchpad, joystick, and the like. The operator input device may also be integrated into a visual display, for example a touch-screen so that specific parameters or operator selections can be provided to the control device. It is also possible that the control device requests an operator for example by means of the operator input device to receive information about options for the predefined working area to be processed by the agriculture machine and/or to present optional parameters related to a predetermined irregular pattern of rows of plant material preferred by the operator. The operator may for example select an option to reduce the number of rows of plant material after processing the predefined working area completely to increase efficiency of a subsequent operation to be performed on the land or the alternative option to process the plant material in the predefined working area by using the predetermined irregular pattern of rows of plant material as fast as possible. The control device may further be configured to automatically determine the predetermined irregular pattern of rows of plant material to be used to process the plant material in the predefined working area, and/or the control device is configured to display a selection to an operator of a number of predetermined irregular patterns of rows of plant material for an operator selection of one of the number of predetermined irregular patterns of rows of plant material to process the plant material in the predefined working area.

The invention further relates to a computer program product as defined in the claim related to a computer program product, comprising a readable storage medium provided with instructions which, if executed on at least one processor of the control device, ensure that the at least one processor carries out the above described method steps. The above-described advantages of the method steps also apply to the computer program product and these are therefore not repeated here.

In addition, the invention relates to an agriculture machine for performing an agricultural operation on a predefined working area or a vehicle pulling the agriculture machine. It is an object of the present disclosure to provide an agriculture machine for performing an agricultural operation on a predefined working area or a vehicle pulling the agriculture machine arranged/configured to use novel patterns of rows of plant material in a predefined working area to process the plant material in the predefined working area in an operator friendly manner.

This object is achieved with the enclosed claim to an agriculture machine for performing an agricultural operation on a predefined working area or a vehicle pulling the agriculture machine. The agriculture machine comprises at least one elongate unit, wherein the at least one elongate unit is configured to displace the plant material substantially in a displacement direction and to lay down the plant material for forming rows of plant material on the predefined working area. The at least one elongate unit may extend substantially traverse to the direction of travel of the agriculture machine such that the displacement direction extends substantially traverse to the direction of travel. The agriculture machine and/or the vehicle comprises at least one tracking device configured for determining the position of the agriculture machine on the predefined working area and a control device configured for determining the displacement direction of the at least one elongate unit for forming each row of laid down plant material on the predefined working area and/or for determining a travel path sequence of the agriculture machine for the formation of rows of laid down plant material on the predefined working area. The control device is configured to use a predetermined irregular pattern of rows of plant material in the predefined working area based on input of the at least tracking device to process the plant material in the predefined working area by changing or by indicating to change the displacement direction of the at least one elongate unit between a formed row and a row to be formed in the predefined working area and/or by changing or by indicating to change a travel path between a formed row and a row to be formed in the predefined working area, wherein between the row to be formed and the formed row there is at least one further travel path which has been processed or is to be processed by the agriculture machine.

By providing such an agriculture machine with the control device configured to use a predetermined irregular pattern of rows of plant material in the predefined working area to process the plant material in the predefined working area, it is possible to cover a relatively large amount of working area's independent of the dimensions of the working area to be processed. An additional advantage of the agriculture machine configuration is that row formation lay outs are possible with relatively few rows of plant material after processing the predefined working area completely, such that a subsequent operation to be performed on the rows can be conducted in a more efficient manner. By the agriculture machine disclosed herein flexibility can be significantly increased while as a result of the control device the step or steps to provide the row formation by using the predetermined irregular pattern of rows of plant material require no or minimal operator intervention or are presented in such a manner that the operations to be performed can be easily executed by the operator without special skills and/or without or minimal training. In addition, the control device using the predetermined irregular pattern of rows of plant material makes it also possible in an efficient manner to adapt the width of the row to be laid down, wherein the width of the row extends substantially traverse to the direction of travel of the agriculture machine. In this manner, the width of the row can be adapted to make the subsequent operation to be performed on the rows more efficient. It is also possible that by means of the control device the widths of the formed rows in the predefined working area vary with respect to each other.

The agriculture machine or the vehicle may comprise an automatic driving system. Such an automatic driving system may use data from the tracking device for guidance of the agriculture machine or the vehicle. The tracking device may include a satellite based navigation receiver, for example a GPS receiver, connected to the control device, which includes a microprocessor adapted for storing and processing GPS information. By using the automatic driving system the agriculture machine may be operated in a more operator-friendly way and reduces the risk of a human error. In one aspect, the automatic driving system is configured to execute the predetermined travel path sequence based on instructions received from the control device.

The control device may also be configured to automatically change the displacement direction of the at least one elongate unit between a formed row and a row to be formed in the predefined working area. The agriculture machine having such control device is relatively operator-friendly.

Alternatively or complementary to the automatic driving system and the control device configured to automatically change the displacement direction, the agriculture machine/vehicle may comprise indicators to provide information/instructions from the control device to an operator. By using an indicator, for example an audible, visual and/or tactile indicator, the operator can be informed/instructed or warned in a user-friendly manner by the control device, for example to (start) change the displacement direction and/or to (start) change the travel path sequence according to the predetermined irregular pattern of rows of plant material.

It is possible that in a handheld portable device such as a tablet computer or a mobile phone, the control device and/or the tracking device may be provided. The handheld portable device may be detachably attachable to a holder of the agriculture machine or the vehicle and may communicate with components of the machine and/or the vehicle to execute the steps to process the plant material in the predefined working area. Such a handheld portable device may also be used as an indicator to instruct or warn the operator to handle accordingly or for monitoring purposes. Instead of using a handheld portable device, the agriculture machine or the vehicle may have an integrated display for an operator configured to display the steps to be taken by the operator based on instructions received from the control device.

Further, the most optimal irregular pattern of rows of plant material for a certain predefined working area can be automatically determined by the control device as the predetermined irregular pattern of rows of plant material from a numerous alternatives Further, the control device may be configured to display a selection to an operator of a number of predetermined irregular patterns of rows of plant material for an operator selection of one of the number of predetermined irregular patterns of rows of plant material to process the plant material in the predefined working area.

The control device may comprise an input device, for example an operator input device to enable the operator to interface with the control device. The control device is configured to receive information by the input device about the predefined working area to be processed by the agriculture machine and/or parameters for a predetermined irregular pattern of rows of plant material. Input information may relate inter alia to field information such as name, location, size, obstacles, and boundary locations, the operations to be performed, conditions of the plant material (wet/dry), weather conditions, the type of agriculture machine to be used for processing, and its geometry. Input information may be manually input via the operator input device or is transferred into the control device wireless via a central communication station or by using a memory card so that the operator can select from stored information. The input device may also be formed by the integrated display mentioned above, for example a touchscreen, or the input device may be formed by the handheld portable device, for example a computer tablet or a mobile phone.

BRIEF DESCRIPTION OF THE FIGURES

The above-described aspects will be explained below by means of exemplary embodiments in combination with the figures. However, the invention is not limited to the exemplary embodiments described below. Rather, a number of variants and modifications are possible which also use the inventive idea and therefore fall within the scope of protection. In particular, the possibility of combining the features/aspects which have only been mentioned in the description and/or been shown in the figures with the features of the claims, in so far as they are compatible, is mentioned.

DETAILED DESCRIPTION

In the figures, similar components are denoted with the same reference signs.

Figure 2:
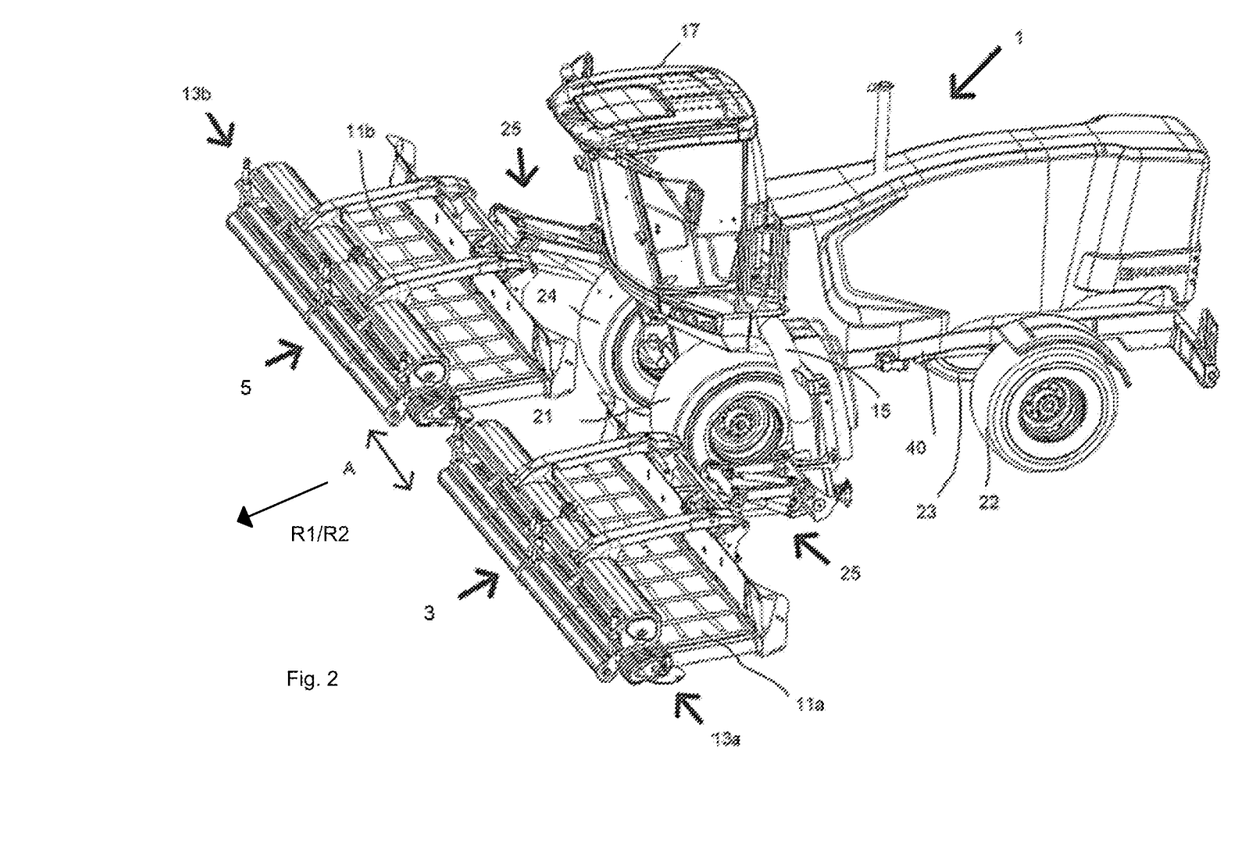
FIG. 2 shows a perspective view of an agriculture machine.

In FIG. 1 multiple travel paths of an agriculture machine 1 are shown, wherein in each travel path the same agriculture machine 1 is shown only for the purpose to clarify the direction of travel R1, R2 of the agriculture machine 1 and the displacement direction A1, A2 of two elongate units 3, 5 of the agriculture machine 1 for forming each row/windrow 6 on a predefined working area indicated with dotted lines and reference sign 8. In FIG. 2 the same agriculture machine 1 is shown as in FIG. 1. This agriculture machine 1 is also shown in FIGS. 3-7.

FIG. 2 shows a perspective side view of the self-propelled agriculture machine 1, more in particular a self-propelled merger 1 (or belt rake) in the operating/working mode for performing an agricultural operation on the land, more particularly forming windrows on the land, wherein the units 3, 5 are at a distance from each other as indicated by arrows A.

Although the figures only show a self-propelled merger 1, the invention described in the claims may also be used in a similar agriculture machine (not shown) being pulled by a vehicle (not shown) or in other self-propelled forage-harvesting machines or self-propelled agricultural machines. In addition, it is possible to use an agriculture machine having a single elongate unit which may have different dimensions than the two elongate units 3, 5 shown in the figures, wherein the agriculture machine having the single elongate unit is arranged to displace the plant material in two displacement directions for forming a row of plant material on the right side or on the left side of the agriculture machine seen in its direction of travel.

Each elongate unit 3, 5 is provided with a conveyor belt 11a, 11b and with a product-picking mechanism 13a, 13b for picking up a plant material-product from the land, for example for picking up hay or a similar product, and displacing the plant material in a displacement direction traverse to the direction of travel R1, R2 by the conveyor belt 11a, 11b, by means of which the product can be deposited on the land again to the left or right of the merger with respect to the direction of travel R1. R2 in order to form a row of plant material (windrow) on the predefined working area 8 (see for example FIG. 1). A windrow is deposited on the land by machines, such as the illustrated merger 1, for a subsequent operation. The subsequent operation may be, for example, shredding, pressing or gathering with a loader wagon. Space is cleared for the tyres/wheels 21, 22, 23, 24 of the merger 1 and/or for another harvesting machine for a subsequent harvesting operation or for performing a subsequent agricultural operation on the land.

In a working mode of the merger 1, the conveyor belts 11a, 11b of the two elongate units 3, 5 may be positioned with respect to each other in such a way that the conveyor belts 11a, 11b can form a single entity for depositing the product to the left or right of the merger 1 with respect to the direction of travel R1, R2. Optionally, the conveyor belts 11a, 11b may deposit the product to the left and right of the merger 1 with respect to the direction of travel R1, 2. In the working position of the two elongate units 3, 5, the product, for example grass, is picked up along virtually the entire length (extending traverse to the direction of travel R1, R2) by means of the product-picking mechanisms 13a, 13b and deposited on the land again in rows via the conveyor belts 11a, 11b. In the working position, the two elongate units 3, 5 are situated in front of the front wheel axle such that the wheels of the merger cannot drive over the product to be picked up, as the product for the machine is picked up by the units 3, 5 and is deposited in such a manner that the wheels cannot come into contact with the grass deposited in rows by the units 3, 5. The total length of the units 3, 5 is at least 1.5 times greater than the width between the outer sides of the front wheels or rear wheels of the merger 1.

The two elongate units 3, 5 are of virtually identical design and are attached to the chassis 40 of the merger 1 in mirror-symmetrical fashion by means of the folding mechanism 15. The merger 1 furthermore comprises a cab 17 which is positioned in such a way that it is situated above the first wheel axle between the working position and the transportation position (not shown) of the elongate units 3, 5. In this way, the driver has an optimum view, both in the transportation mode (FIG. 1) of the merger 1 and in the working mode (FIGS. 2a,b) of the merger 1. In the working position, each unit 3, 5 is situated in front of the first wheel axle, whereas each unit 3, 5 is largely or even entirely situated behind the first wheel axle in the transportation position. The two elongate units 3, 5 are each provided with a displacement unit 25 by means of which, in the working position, the distance A (FIG. 2) between the at least two elongate units 3, 5 viewed in the longitudinal direction of the two elongate units can be adjusted. The distance A between the units 3, 5 in the working position is at its greatest if the first unit 3 is moved to the left with respect to the direction of travel R1, R2 to the greatest extent and the second unit 5 is moved to the right with respect to the direction of travel R1, R2 to the greatest extent. The distance can be varied between no or virtually no distance and the maximum distance A between the units 3, 5.

If there is a predetermined distance A of, for example, 1.5 metres between the units 3, 5 in the working position, a product may be picked up off the land by means of the product-picking mechanisms 13a, 13b and may be moved traverse with respect to the direction of travel R1, R2 of the merger 1 in order to form a central windrow as shown in FIG. 1, for example in order to form a windrow between the wheels 21, 22, 23, 24 of the merger 1. The longitudinal direction (extending substantially traverse with respect to the direction of travel R1, R2 of the merger 1) of the at least two elongate units 3, 5 is during the agricultural operation substantially located on a single virtual straight line independent of a distance A between the units 3, 5. In addition, the displacement direction A1, A2 of the two elongate units 3, 5 can be controlled independently with respect to the other of the at least two elongate units. For laying down a row or rows of plant material on a lateral side, i.e. right side and/or on a left side, of the agriculture machine the increased distance A may be maintained and/or the distance A is reduced to substantially no distance between the two elongate units 3, 5. In FIG. 1 a pattern of parallel extending rows is shown. The pattern is a regular pattern of "central" windrows 6 formed by the merger 1. In the regular pattern the distance between the windrows 6 on the predefined working area 8 is identical or substantially identical, if there are no obstacles on the land, as shown. It is possible to use an offset O as shown in FIG. 1, i.e. a first travel path I of the merger 1 has a minimal overlap with a second adjacent travel path II of the merger. This offset O is used for all the travel paths I-VI shown in FIG. 1. The nett working width W (extending substantially traverse to the travel direction R1, R2) of the merger 1 on the predefined working area 8 as shown in FIG. 1 is determined by the following calculation:

$$W = (C1 + C2 + F) - O$$

wherein C1 is the working length of unit 3, C2 is the working length of unit 5 and F is width of the windrow 6. In the merger 1 the distance C1 is identical to distance C2, because the units 3, 5 are identical. FIG.

1 shows that the nett working width W is constant in FIG. 1, such that no adaptations in the configuration of the merger 1 are required for processing the predefined working area 8.

Figure 3:
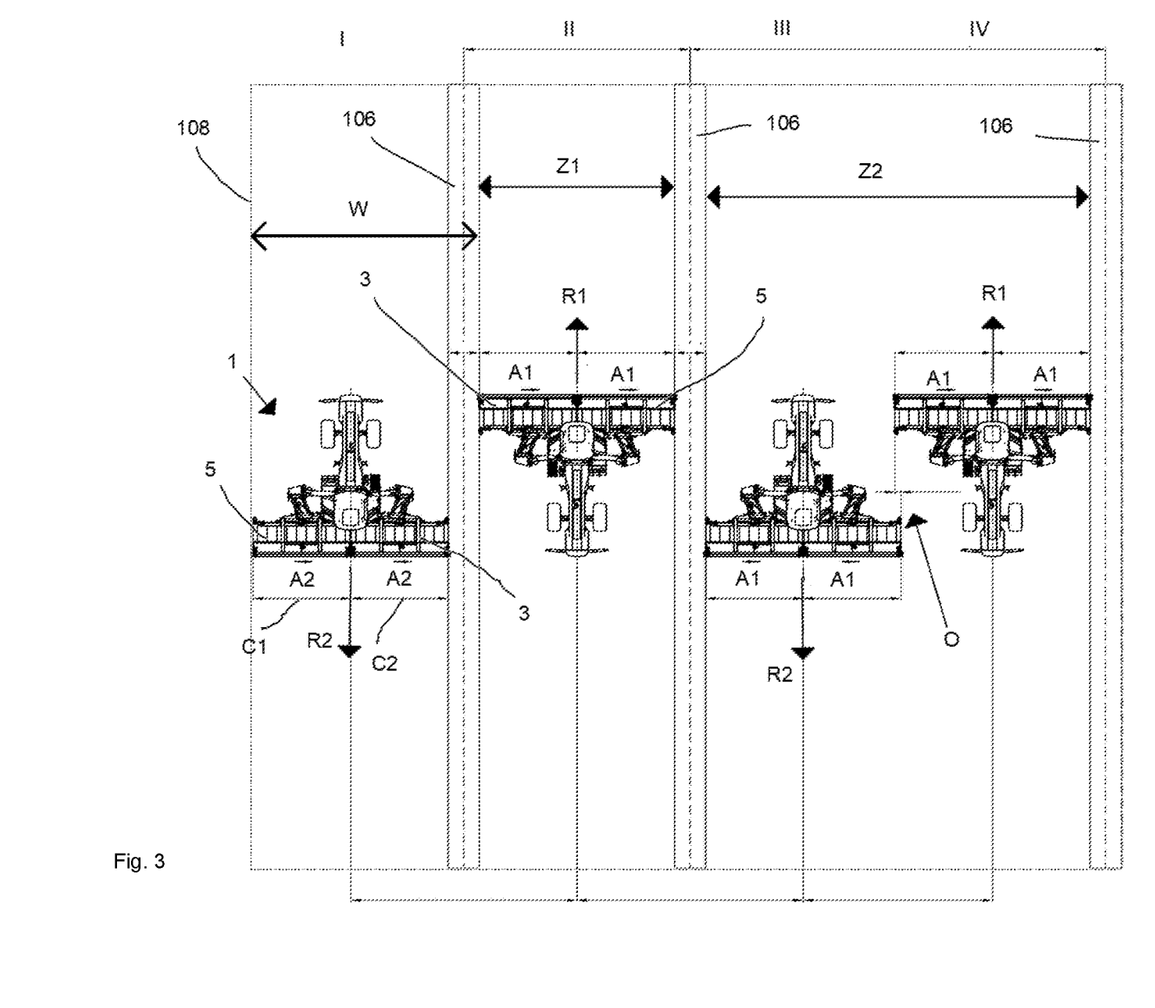
FIGS. 3, 4, 5, 6, and 7 each respectively show top views of irregular pattern of rows of laid down plant material formed on the land during processing the plant material in the predefined working area.
Figure 4:
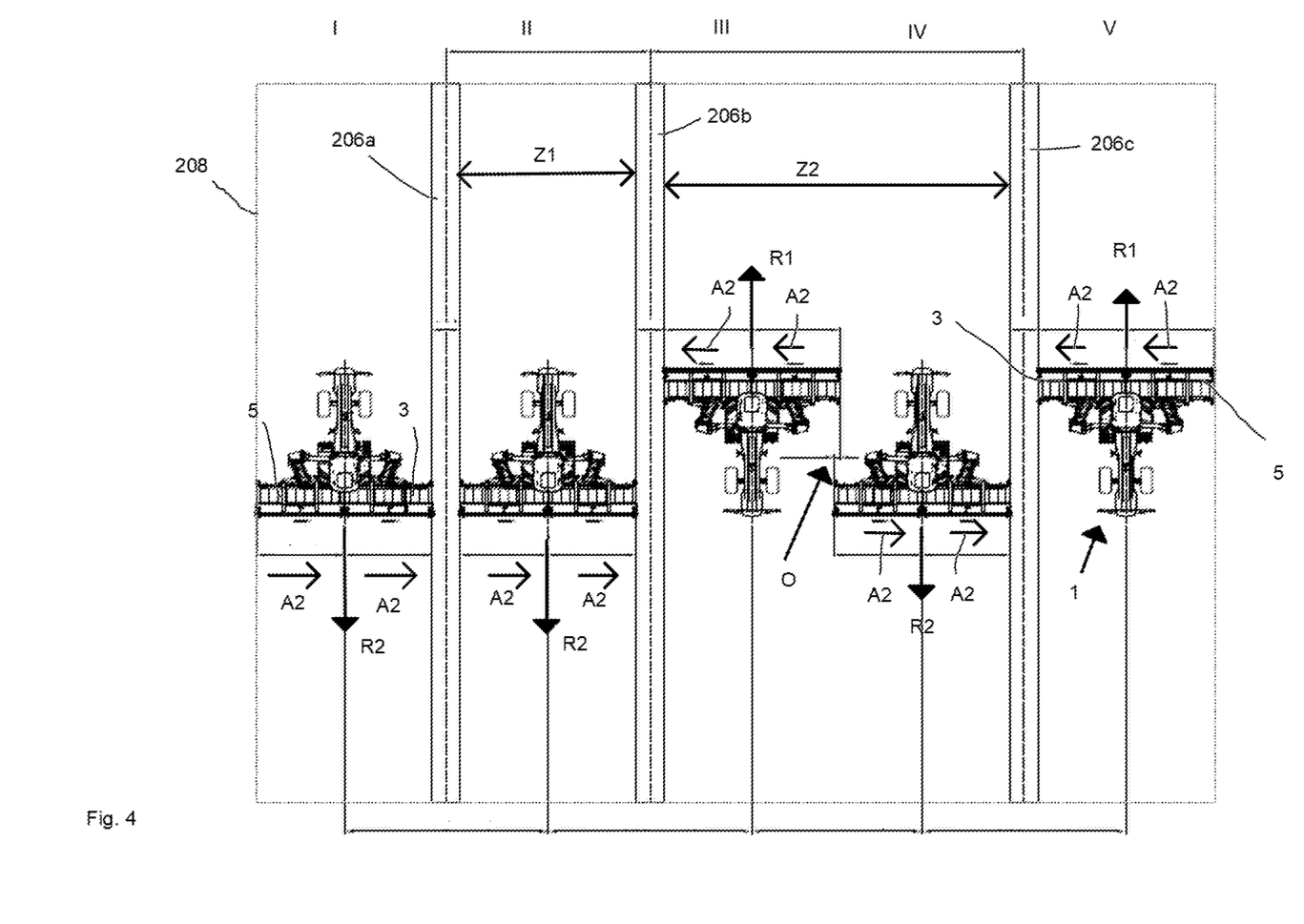
Figure 5:
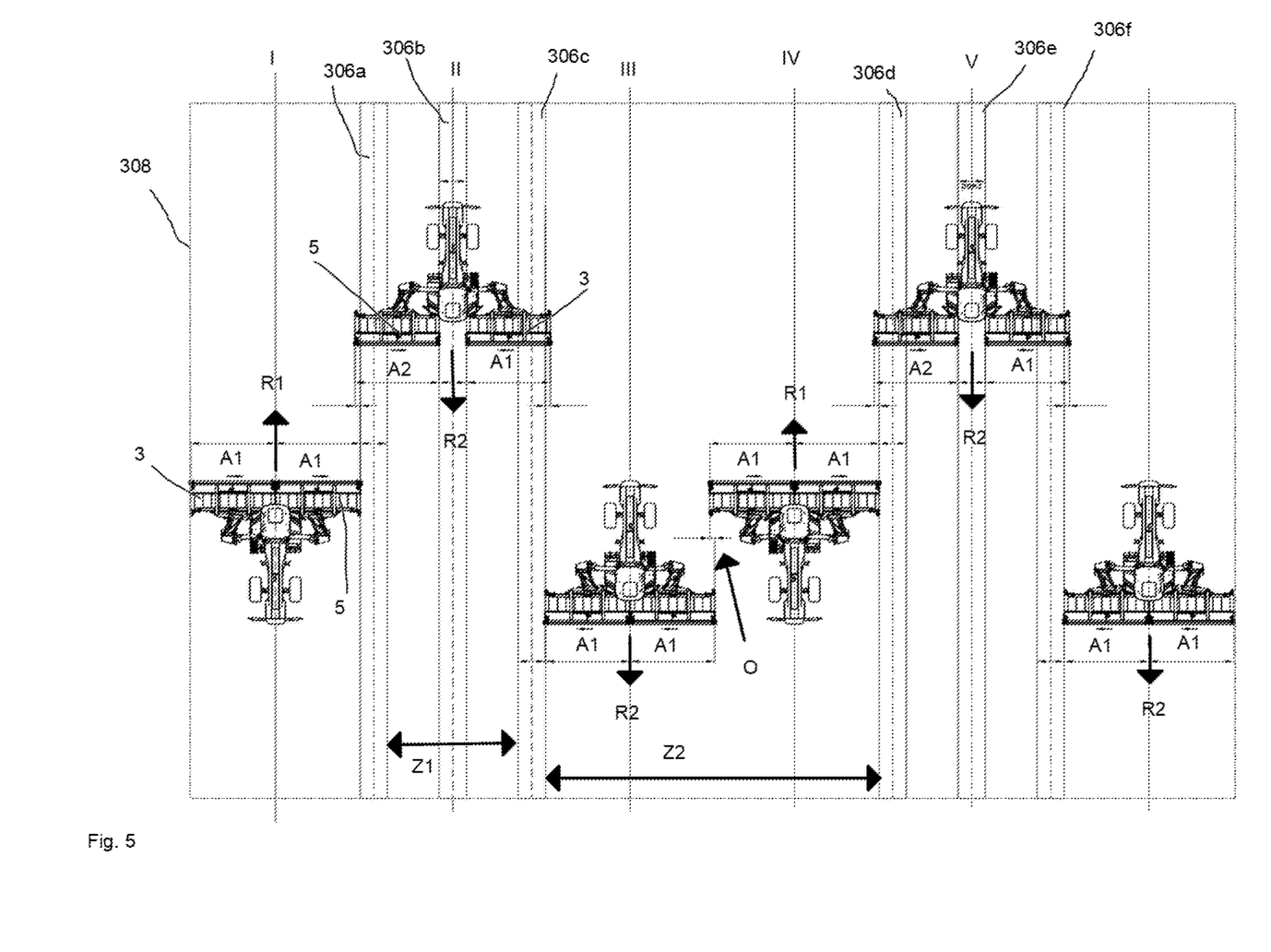

FIGS. 3-7 show top views of irregular pattern of rows of plant material formed on the land by using the method as claimed and/or the agriculture machine 1 as claimed. These patterns are obtainable in use by an agriculture machine (hereafter merger) 1 for performing an agricultural operation on a predefined working area 108; 208; 308; 408; 508 or a vehicle (not shown) pulling the agriculture machine (not shown). The merger 1 may comprise a single elongate unit (not shown) for example extending substantially traverse to the direction of travel R1, R2 to obtain patterns as shown in FIGS. 3, 4, 6 and 7, wherein the displacement direction can be changed from the left to the right or vice versa with respect to the direction of travel R1, R2 for each travel path if required. However, the merger shown in the figures comprises two elongated units 3, 5 as discussed above, such that besides "side" windrows (or "lateral" windrows), the merger is able to provide "central" windrows. FIG. 5 shows an example using "side windrows" and "central" windrows for processing the plant material in the predefined working area 308. The merger 1 comprises at least one tracking device 150 (FIG. 8) configured for determining the position of the agriculture machine on the predefined working area. Components (not shown) of the tracking device 150 for receiving signals may for example be installed on the roof of the cabin 17. The merger 1 comprises a control device 250 (FIG. 8) configured for determining the displacement direction A1 or A2 of the elongate units 3, 5 for forming each row 106; 206a-c; 306a-f; 406; 506a-f of laid down plant material on the predefined working area 108; 208; 308:408; 508 and/or for determining a travel path sequence (wherein adjacent travel paths are indicated by consecutive Roman Numerals I-IV. I-V, etcetera) of the merger 1 for the formation of rows of laid down plant material on the predefined working area. The control device 250 is configured to use a predetermined irregular pattern of rows of plant material in the predefined working area for processing the plant material in the predefined working area based on input of the at least tracking device 150 by changing or by indicating to change the displacement direction A1; A2 of the at least one elongate unit between a formed row and a row to be formed in the predefined working area and/or by changing or by indicating to change a travel path (indicated by Roman Numerals I-IV, I-V, etcetera) between a formed row and a row to be formed in the predefined working area, wherein (see for example FIG. 4 showing the results of the predetermined travel path sequence used to form the rows 206a-c) between the row 206b to be formed and the formed row 206a there is at least one further travel path (travel path II in FIG. 4) which has been processed (not the case in FIG. 4 between rows 206a and 206b) or is to be processed by the agriculture machine (travel path II as shown in FIG. 4).

As can be clearly seen in the FIGS. 3-7, a relatively large predefined working area 108; 208; 308:408; 508 may comprise relatively few rows. In addition, the nett working width W (extending substantially traverse to the travel direction R1, R2) of the merger 1 may also vary between travel paths in the predefined working areas, which makes more combinations possible such that it is possible to cover (much) more working area's by the merger 1 in a manner less independent of the dimensions of the working area to be processed or in a more efficient manner. In this way as a result of using the predetermined irregular pattern of rows of laid down plant material flexibility is increased while the steps executed by the control device to provide the irregular pattern of rows of plant material require no or minimal operator intervention or are presented in such a manner that the operations to be performed can be easily executed by the operator without special skills.

Figure 8:
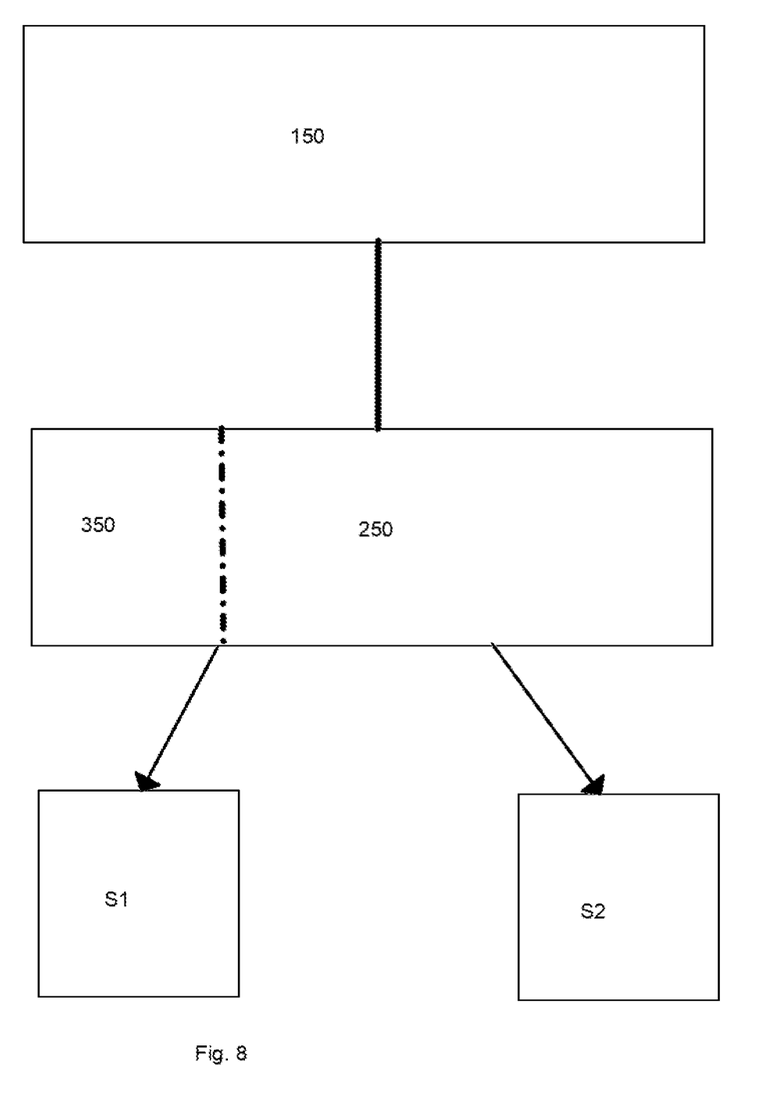
FIG. 8 shows a simplified block diagram of components used to perform the steps to provide an irregular pattern of rows of plant material.

The merger 1 may comprise an automatic driving system, wherein the automatic driving system may further be configured to execute a predetermined travel path sequence based on instructions received from the control device 250 (FIG. 8). In addition or instead of the automatic driving system, a panel (not shown) containing instruments and controls for example in the cabin 17 facing the operator of the merger 1 may comprise indicators (not shown) to provide information/instructions from the control device to the operator for example to execute or to verify the steps associated to the predetermined irregular pattern of rows of plant material in the predefined working area, for example by steering instructions to complete the predetermined travel path sequence and/or by instructions to change the displacement direction A1; A2 of the units 3, 5. The panel may have an display (not shown) for an operator configured to display the steps to be taken by the operator based on instructions received from the control device. The control device also comprises an input device 350, for example an operator input device to enable the operator to interface with the control device 250. The input device 350 may be part of the display, for example by providing a display with a touchscreen.

FIG. 8 shows components 150, 250 and steps S1 and S2, besides the agriculture machine 1 described above to complete a method for performing an agricultural operation on a predefined working area using at least one tracking device 150 configured for determining the position of the agriculture machine 1 on the predefined working area 108; 208; 308; 408; 508 and using a control device 250 configured for determining the displacement direction A1, A2 of the at least one elongate unit 3, 5 for forming each row 106; 206a-c; 306a-f; 406; 506a-f of laid down plant material on the predefined working area and/or for determining a travel path sequence of the agriculture machine 1 for the formation of rows 106; 206a-c; 306a-f; 406; 506a-f of laid down plant material on the predefined working area, wherein the control device 250 is configured to use a predetermined irregular pattern of rows of plant material in the predefined working area to process the plant material in the predefined working area by performing at least one of the following steps S1, S2 based on input of the at least one tracking device 150:

Step S1 change or indicate to change the displacement direction of the at least one elongate unit between a formed row and a row to be formed in the predefined working area;

Step S2 change or indicate to change a travel path between a formed row and a row to be formed in the predefined working area, wherein between the row to be formed and the formed row there is at least one further travel path which has been processed or is to be processed by the agriculture machine.

The control device 250 is configured to receive information about the predefined working area to be processed by the agriculture machine and/or to receive parameters related to an irregular pattern of rows of plant material. The control device 250 may comprises an input device 350, for example an operator input device 350 to enable the operator to interface with the control device 250 or an input device receiving the information in wireless manner from a central station or from a handheld portable device such as a mobile which may be connected to the internet to obtain the required information.

The patterns shown in the predefined working area 108; 208 in FIGS. 3 and 4 are a simplified example of the basic principle of the above described method.

In FIG. 3 in the first travel path I of the merger 1 moving in a travel direction R2 a first "side" windrow (or "lateral" windrow) 106 is produced by using the entire length (C1+C2) of the two elongated units 3, 5 positioned against each other by using the displacement direction A2. Between the first travel path I and the second adjacent travel path II, i.e. between the formed first "side" windrow and a second "side" windrow (next row towards the right in FIG. 3) to be formed in the predefined working area, the control device 250 (automatically) changes or indicates to an operator to change the displacement direction A2 of the unit 3, 5 to the displacement direction A1. After moving the merger in travel direction R1 in the second travel path II the second "side" windrow is formed. Then, in the subsequent travel paths III and IV no further changes are made with respect to the displacement direction of the units 3, 5, i.e. the displacement direction remains A1 such that in travel path III the second "side" windrow is further "filled" or completed with plant material and in travel path IV the last third "side" windrow is formed in the predefined working area 108. As a result of the offset (or overlap) O it is further evident that the nett working width of the merger 1 changes. As a result of the increased distance Z2 between the second "side" windrow and the third "side" windrow with respect to the distance Z1 between the first "side" windrow and the second "side" windrow an irregular pattern of rows of plant material in the predefined working area 108 has been provided by means of the control device 250 using a predetermined irregular pattern of rows of plant material in the predefined working area 208.

In FIG. 4 the merger 1 uses a travel path sequence determined by the control device 250, which differs from a travel path sequence in which each travel path travelled by the merger 1 is directly adjacent to the following travel path as shown in FIGS. 1 and 3. In the process to provide the irregular pattern of rows of plant material in the predefined working area 208 as shown in FIG. 4, the displacement direction A2 of the units 3, 5 remains unchanged between the travel paths I-V to be driven by the merger 1. In the first travel path I of the merger 1 moving in a travel direction R2 a first "side" windrow 206a is produced by using the entire length (C1+C2) of the two elongated units 3, 5 positioned against each other by using the displacement direction A2. After finishing the first travel path I, i.e. between the formed first "side" windrow 206a and a second "side" windrow 206b (next row towards the right in FIG. 4) to be formed in the predefined working area 208, the control device 250 (automatically) changes or indicates to an operator to change the travel path sequence, wherein between the row to be formed by using the predetermined travel path sequence and the formed row there is at least one further travel path II which is to be processed by the merger 1 in a subsequent action. In other words, after completing travel path I and instead of travel path II, travel path III should be driven first by the merger 1, wherein after completing travel path III, travel path II is driven followed by travel path V and finalized by travel path IV which results in an irregular pattern of rows of laid down plant material in the predefined working area 208 as shown in FIG. 4.

In FIG. 5 the travel path sequence used by the control device 250, i.e. a predetermined travel path sequence, is as follows: the merger 1 is first driven through travel path I, then III, IV, VI, V and II. In paths I, III, IV and VI the displacement direction A1 of the units 3, 5 remains unchanged. After completing these paths, the units 3, 5 of the merger are displaced by the displacement unit 25 as described above to obtain distance A (FIG. 2) therebetween, i.e. the configuration of the merger 1 is adapted from forming "side" windrow to a "central" windrow to execute travel paths II and V with the merger 1. The method steps S1 and S2 are used by the control device 250 using a predetermined irregular pattern of rows of plant material in the predefined working area 308 to process the plant material in the predefined working area 308, i.e. the displacement direction A1 to A2 of elongate unit 5 is changed once and non-adjacent travel paths are used to process the complete surface of the predefined working area 308. In FIG. 5, the windrows 300a, 300c are joined into a single windrow 300b after executing travel path II by means of the merger 1, wherein the windrows 300d, 300f are joined into a single windrow 300e after executing the travel path V by means of the merger 1. After using the predetermined irregular pattern of rows of plant material in the predefined working area by the control device to process the plant material in the predefined working area 308 only two windrows 306b, 306e remain in the predefined working area 308. As a result of the predetermined irregular pattern of rows of plant material in the predefined working area used by the control device 250, the distance between the first three windrows 306a,b,d formed is unequal, i.e. the distance Z1 between two adjacent windrows 306a,b is smaller than the distance Z2 between two adjacent windrows 306b,d.

Figure 6:
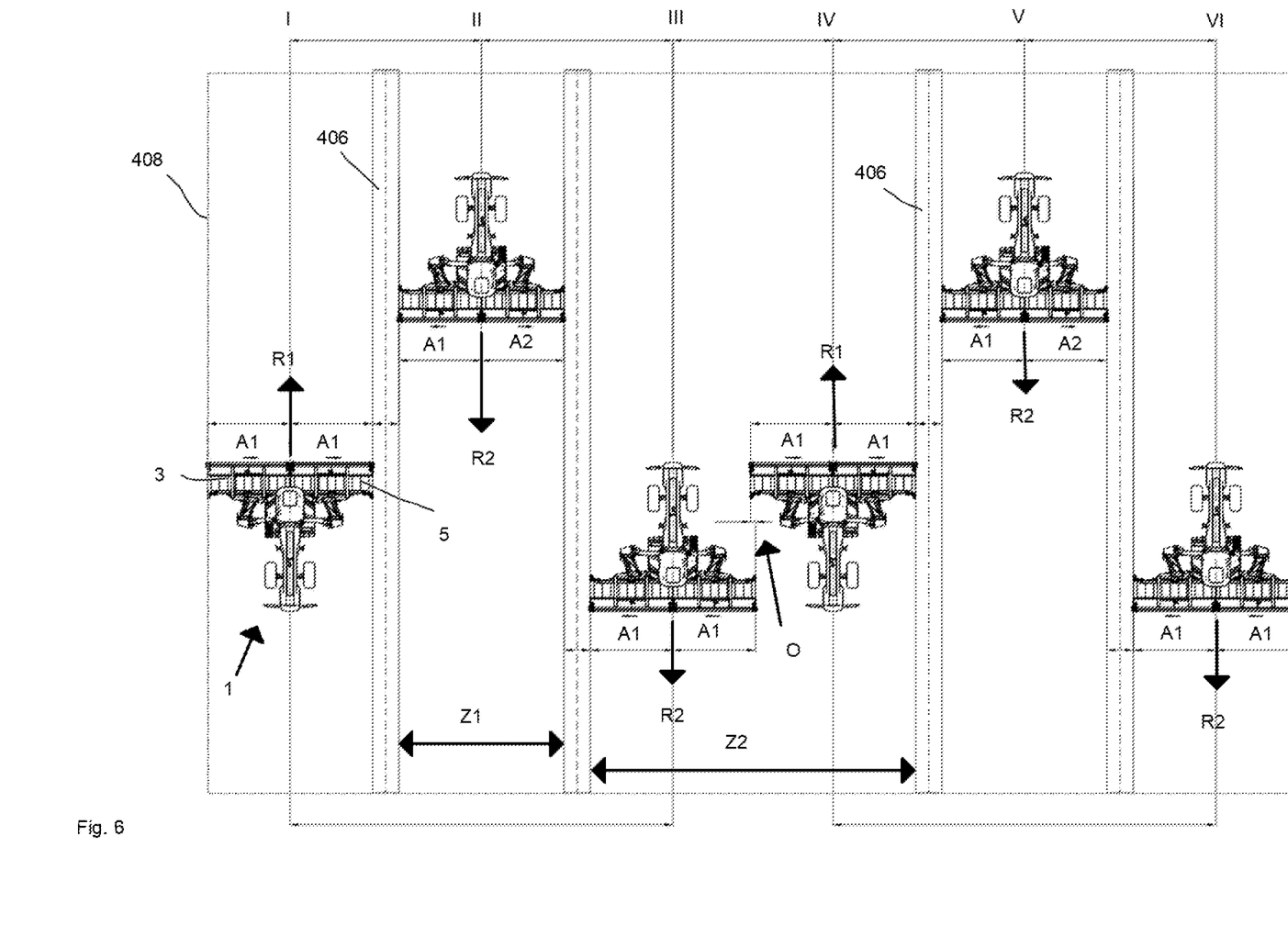

In FIG. 6 the travel path sequence used by the control device 250, i.e. the predetermined travel path sequence, is the same as in FIG. 5, i.e. the merger 1 is first driven through travel path I, then III, IV, VI, V and II. In paths I, III, IV and VI the displacement direction A1 of the units 3, 5 remains unchanged. After completing these paths, the displacement direction A1 to A2 of the elongate unit 3 is changed once to complete paths V and II to process the complete surface of the predefined working area 408. After using the predetermined irregular pattern of rows of plant material in the predefined working area by the control device 250 to process the plant material in the predefined working area 408 four windrows 406 are formed in the predefined working area 308, wherein the distance Z1 between the first and the second adjacent windrows is smaller than the distance Z2 between the second and third adjacent windrows.

Figure 7:
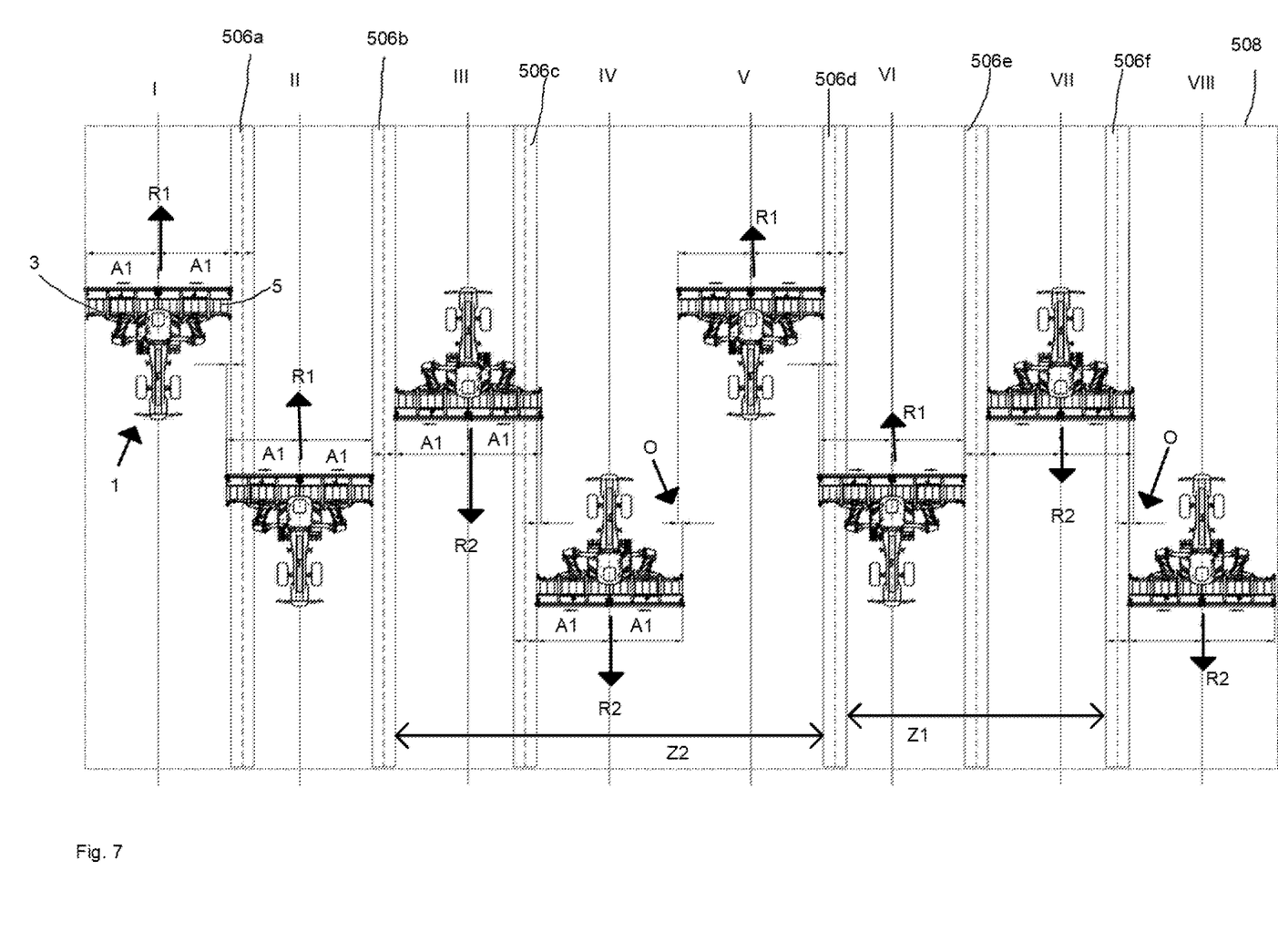

In FIG. 7 the travel path sequence used by the control device 250, i.e. the predetermined travel path sequence, is I, IV, II, III, V, VIII, VI, VII, such that non-adjacent travel paths in the travel path sequence are used to process the complete surface of the predefined working area 508. During the process in the predefined working area 508, the displacement direction A1 of the units 3, 5 remains unchanged between the travel paths I-VIII. After using the predetermined irregular pattern of rows of plant material in the predefined working area by the control device to process the plant material in the predefined working area 508 only two windrows 506b, 506e of the six formed windrows 506a-f remain in the predefined working area 508. As a result of the predetermined irregular pattern of rows of plant material in the predefined working area 508 used by the control device 250, the distance between the three subsequently formed and adjacent windrows 506b,d,f is unequal, i.e. the distance Z1 between two adjacent windrows 506d,f is smaller than the distance Z2 between two adjacent windrows 506b,d.

As a result of the offset (or overlap) O it is further evident that the nett working width of the merger 1 changes during use for formation of the predetermined irregular patterns of rows of plant materials as shown in FIGS. 4-7.

It is noted that different travel path sequences using non-adjacent travel paths in the travel path sequence are possible than described above to process the plant material in the predefined working area 208 308; 408; 508 to obtain the same results as shown in the FIGS. 3-7. For example in FIG. 3, it is possible, but normally less efficient, to drive path IV before path III.

The invention claimed is:

1. A method for performing an agricultural operation on a predefined working area which is processed by means of an agriculture machine including at least one elongate unit, at least one tracking device, and a control device, the method comprising the steps of:
   using the at least one elongate unit to displace plant material substantially in a displacement direction and laying down rows of the plant material on the predefined working area,
   using the at least one tracking device to determine the position of the agriculture machine on the predefined working area and
   using the control device to perform at least one of: (1) determining the displacement direction of the at least one elongate unit for forming each row of laid down plant material on the predefined working area and (2) determining a travel path sequence of the agriculture machine for the formation of rows of laid down plant material on the predefined working area, wherein the control device is configured to use a predetermined irregular pattern of rows of plant material in the predefined working area to process the plant material in the predefined working area by performing at least one of the following steps based on input of the at least one tracking device:
      change or indicate to change the displacement direction of the at least one elongate unit between a formed row and a row to be formed in the predefined working area;
      change or indicate to change a travel path between a formed row and a row to be formed in the predefined working area, wherein between the row to be formed and the formed row there is at least one further travel path which has been processed or is to be processed by the agriculture machine,
   wherein the agriculture machine comprises at least two of the elongate units for displacing and laying down the plant material, wherein the displacement direction of the at least two elongate units can be controlled independently with respect to the other of the at least two elongate units, and
   wherein for laying down a row of plant material between the at least two elongate units a distance between the at least two elongate units is increased viewed in a direction substantially traverse to the direction of travel, wherein for laying down a row or rows of plant material on at least one of a right side and a left side of the agriculture machine with respect to the direction of travel of the agriculture machine the increased distance is maintained or the distance is reduced to substantially no distance between the at least two elongate units.

2. The method according to claim 1, wherein the agriculture machine or a vehicle pulling the agriculture machine is automatically driven to process the plant material in the predefined working area.

3. The method according to claim 1, wherein based on instructions received from the control device the displacement direction of the at least one elongate unit between a formed row and a row to be formed in the predefined working area is automatically changed.

4. The method according to claim 1, wherein the step or steps to be performed are provided to an operator by at least one indicator, for example by the at least one indicator in a cabin of the agriculture machine or in a cabin of a vehicle pulling the agriculture machine.

5. The method according to claim 1, wherein the control device is configured to receive information about the predefined working area to be processed by the agriculture machine.

6. The method according to claim 1, wherein the control device is configured to perform at least one of: (a) automatically determine the predetermined irregular pattern of rows of plant material to process the plant material in the predefined working area and (b) display a selection to an operator of a number of predetermined irregular patterns of rows of plant material for an operator selection of one of the number of predetermined irregular patterns of rows of plant material to process the plant material in the predefined working area.

7. An apparatus for performing an agricultural operation on a predefined working area, comprising:
   an agriculture machine having at least two elongate units configured to displace plant material substantially in a displacement direction and to lay down the plant material for forming rows of plant material on the predefined working area, wherein a displacement direction of each of the at least two elongate units is controllable in an independent manner,
   at least one tracking device configured for determining the position of the agriculture machine on the predefined working area,
   a control device to perform at least one of: (a) determining the displacement direction of the at least one elongate unit for forming each row of laid down plant material on the predefined working area and (b) determining a travel path sequence of the agriculture machine for the formation of rows of laid down plant material on the predefined working area, and
   wherein the control device is configured to use a predetermined irregular pattern of rows of plant material in the predefined working area based on input of the at least one tracking device to process the plant material in the predefined working area by at least one of: (a) changing or indicating to change the displacement direction of the at least one elongate unit between a formed row and a row to be formed in the predefined working area and (b) changing or indicating to change a travel path between a formed row and a row to be formed in the predefined working area, wherein between the row to be formed and the formed row there is at least one further travel path which has been processed or is to be processed by the agriculture machine, and
   a displacement unit controllable by means of the control device, wherein by means of the displacement unit, in the working position, the distance between the at least two elongate units is adjustable, viewed in a direction traverse to the travel direction.

8. The apparatus according to claim 7, wherein the agriculture machine or a vehicle pulling the agriculture machine comprises an automatic driving system.

9. The apparatus according to claim 8, wherein the automatic driving system is configured to execute the predetermined travel path sequence based on instructions received from the control device.

10. The apparatus according to claim 7, wherein the control device is configured to automatically change the displacement direction of the at least one elongate unit between a formed row and a row to be formed in the predefined working area.

11. The apparatus according to claim 7, wherein the agriculture machine or the vehicle pulling the agriculture machine includes indicators to provide information or instructions from the control device to an operator.

12. The apparatus according to claim 7, wherein in a handheld portable device at least one of (a) the control device and (b) the tracking device is provided, wherein the handheld portable device is detachably attachable to a holder of the agriculture machine or the vehicle.

13. The apparatus according to claim 7, wherein the control device is configured to perform at least one of: (a) automatically determine the predetermined irregular pattern of rows of plant material to process the plant material in the predefined working area, and (b) display a selection to an operator of a number of predetermined irregular patterns of rows of plant material for an operator selection of one of the number of predetermined irregular patterns of rows of plant material to process the plant material in the predefined working area.

14. The apparatus according to claim 7, wherein the agriculture machine or the vehicle have an integrated display for an operator configured to display the steps to be taken by the operator based on instructions received from the control device.

15. The apparatus according to claim 7, wherein the control device comprises an input device.

16. The apparatus according to claim 12, wherein the control device comprises an input device and wherein the input device is formed by the integrated display.

* * * * *